No. 845,540. PATENTED FEB. 26, 1907.
R. T. FERGUSON, H. TURNER & O. J. HALLER.
VALVE.
APPLICATION FILED FEB. 28, 1906.
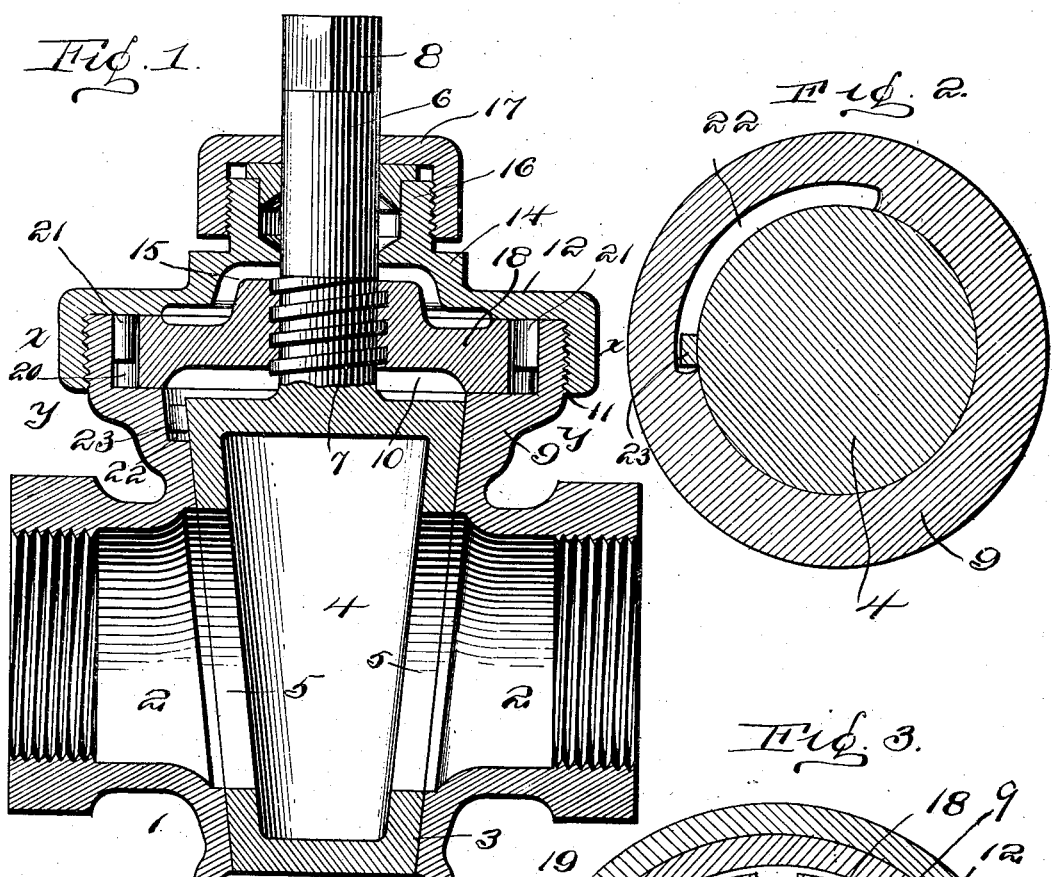
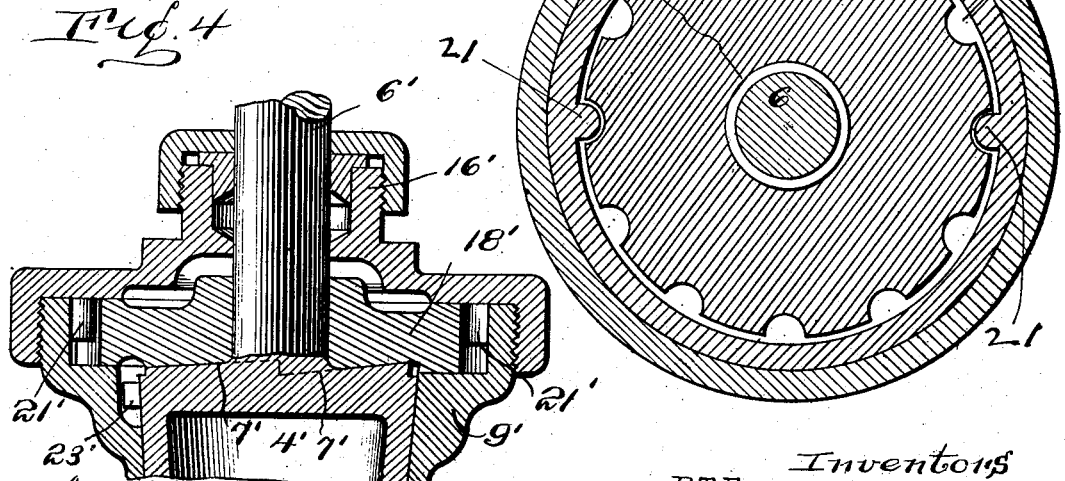
Witnesses
Samuel Payne
Inventors
R. T. Ferguson, H. Turner and
O. J. Haller.
by their Attorneys

UNITED STATES PATENT OFFICE.

ROBERT T. FERGUSON, OF ALLEGHENY, AND HARRY TURNER AND OLIVER J. HALLER, OF PITTSBURG, PENNSYLVANIA.

VALVE.

No. 845,540.  Specification of Letters Patent.  Patented Feb. 26, 1907.

Application filed February 28, 1906. Serial No. 303,347.

*To all whom it may concern:*

Be it known that we, ROBERT T. FERGUSON, residing at Allegheny, and HARRY TURNER and OLIVER J. HALLER, residing at Pittsburg, in the county of Allegheny and State of Pennsylvania, citizens of the United States of America, have invented certain new and useful Improvements in Valves, of which the following is a specification, reference being had therein to the accompanying drawing.

This invention relates to certain new and useful improvements in valves and cocks, and relates more particularly to a valve or cock having a tapering valve for controlling the passage through the valve body or casing.

The primary object of this invention is the provision of positive and reliable means for effecting a perfect adjustment of the valve to insure a perfect operation of the same within the valve body or casing.

In the manufacture of valves and cocks considerable trouble is experienced in properly seating the valve, it being impossible to determine accurately the positioning of the valve within the valve body or casing to permit of the same being rotated and insuring a proper registration of the openings of a valve-body and the ports of the valve. In the majority of instances it is necessary that the valve be reground and tested a number of times before a perfectly fitting thereof with the seat in the valve body or casing is obtained.

Our invention aims to obviate the above defects by providing means for accurately adjusting and positioning the valve within a valve body or casing, thus permitting of the valves being accurately reseated when they have become worn and have been reground to be further used.

Another feature of our invention resides in providing an adjustment mechanism for the valve which will be thoroughly housed or incased within the valve-body, thereby preventing the general operation of the valve or cock from interfering with the adjusting mechanism of the valve, also preventing said mechanism from being affected from surrounding existing conditions.

With the above and other objects in view the invention consists in the novel construction, combination, and arrangement of parts to be hereinafter more fully described and claimed, and referring to the drawing accompanying this application like numerals of reference designate corresponding parts throughout the several views, in which—

Figure 1 is a vertical sectional view of a valve or cock constructed in accordance with our invention. Fig. 2 is a cross-sectional view taken on the line $y\,y$ of Fig. 1. Fig. 3 is a similar view taken on the line $x\,x$ of Fig. 1. Fig. 4 is a fragmentary vertical sectional view of a valve or cock, illustrating a slight modification.

In the accompanying drawing we have illustrated a conventional form of valve or cock consisting of a body portion 1, having diametrically opposed ports or openings 2 2 formed therein. The body of the valve or cock is provided with a tapering seat 3 for a tapering valve 4, which is often termed a "plug." The valve is hollow and is provided with two diametrically opposed slots or ports 5 5, adapted when the plug is disposed in one position to register with the ports 2 2 of the valve-body. The valve is provided with an upwardly-extending stem 6, carrying a conventional form of screw-thread 7 and having its end squared or provided with faces 8 for the reception of an operating handle or wheel by which the valve is rotated within the valve-body 1.

One feature of our invention resides in providing the valve-body with an annular enlargement 9, having an annular plate-cavity 10 formed therein. The enlargement 9 is exteriorly screw-threaded, as at 11, to receive a cap 12, said cap being formed with a central enlargement 14, through which the stem 6 extends. The underneath face of the cap 12 is provided with a recess 15, while the upper portion of the enlargement 14 conforms to a stuffing-box 16, having a detachable gland 17, said stuffing-box being of a conventional form adapted to receive packing, which is retained therein by the gland 17.

In the cavity 10 of the enlargement 9 is mounted an annular adjusting or regulating plate 18, having a central enlargement in which is formed a vertically-disposed screw-threaded opening 19, in which the thread 7 of the stem 6 is adapted to engage. The periphery or edges of the plate 18 are scalloped or provided with a plurality of grooves 20, said grooves being equally spaced apart and extending from the top surface of said plate to the bottom surface thereof. The side walls of the plate-cavity 10 are provided with two diametrically opposed lugs 21, said lugs being substantially semicylindrical and adapted to fit within the grooves 20 of the adjusting or regulating plate 18. The annular enlargement surrounding the valve 4 is provided with a segment-shaped recess 22, said recess bordering upon approximately one-quarter of the periphery of the valve 4. The upper edge of the valve is provided with a radially-disposed projection 23, adapted to engage in the recess 22 and limit the movement of the valve 4 within the valve-body.

In operation the stem 6 of the valve 4 is rotated to partially unseat the valve and move the ports or slots 5 5 of the valve in and out of alinement with the openings or ports of the valve-body. In rotating the stem 6, carrying the valve 4, the open position of the valve—that is, the registration of the ports 5 5 with the openings or ports 2 of the valve-body—is determined by the projection 23 in the recess 22 of the enlargement 9, said projection limiting the revoluble movement of the valve and only permitting it to rotate approximately a quarter of a revolution. The projection 23 also determines when the valve-body is closed, thus permitting the valve to be quickly opened and closed, the position of the same being determined by the handle or wheel mounted upon the upper end of the stem 6.

Our invention particularly resides in the adjusting or regulating plate 18, mounted within the plate-cavity 10. It will be observed that by removing the cap 12 the valve, together with the plate 18, can be elevated and partially turned in order that it may be reseated to have the lugs 21 21 engage in two other grooves 20. As the plate 18 is provided with a plurality of equally-spaced grooves, a very minute adjustment may be had between said plate and the stem 6. For instance, when six threads are used to an inch upon the stem 6 and twelve equally-spaced grooves are formed in the plate 18 approximately a seventy-second part of an inch adjustment can be obtained in the valve 4 by simply unseating the plate 18, rotating a twelfth of a revolution upon the stem, and reseating. This may also be accomplished by simply elevating the stem 6 and the plate 18 and turning them in unison until the next set of grooves 20 is in position to receive the lugs 21 21 of the enlargement 9.

In Fig. 4 of the drawings we have illustrated a valve 4', having a stem 6', said stem being plain or stripped of threads and the seating and unseating of the valve accomplished through the medium of cam-surfaces 7' 7', formed upon the under face of a plate 18' and the top of the valve 4', and in connection with a valve and stem constructed in this manner the plate 18' is used, which is retained temporarily in a fixed position within the enlargement 9' by lugs 21' 21'. The construction shown in Fig. 4 of the drawings is simply a modification wherein the threads of the stem 6, previously described, are dispensed with, and in this connection we desire to be understood that we do not care to confine ourselves specifically to the means for seating and unseating the valve of a valve-body or cock, our invention residing entirely in the construction of the plate 18 and its appurtenant parts.

From the foregoing description it will be observed by the construction of our improved valve or cock we are enabled to obtain an accurate and minute adjustment of the valve 4 within the valve-body at any desired time. Consequently the valve can be removed from the valve-body or cock and reground when it has become worn and properly reseated with the least expenditure of labor or time.

We do not care to confine ourselves to the number of threads used in connection with the stem 6, the number of grooves used in connection with the plate 18, or to the size or minor details of the valve or cock. Such other changes as are permissible by the appended claim may be resorted to without departing from the spirit and scope of the invention.

What we claim, and desire to secure by Letters Patent, is—

A valve including a body having a valve-seat transversely of its passage-way and with converging walls and a lateral enlargement whereby an annular shoulder is formed around the outer end of the valve-seat and with stop-lugs extending over said shoulder, a plate having a central threaded aperture seated upon said shoulder and with spaced peripheral recesses adapted for engagement consecutively with said stop-lugs, a tapering valve engaging said valve-seat and having a threaded stem engaging the threaded aperture of said plate, means for limiting the movement of said valve, and a cap engaging the lateral enlargement of the body and bearing upon said plate and maintaining the same in position.

In testimony whereof we affix our signatures in the presence of two witnesses.

ROBERT T. FERGUSON.
HARRY TURNER.
OLIVER J. HALLER.

Witnesses:
A. M. WILSON,
C. KLOSTERMANN.